United States Patent
Iguchi et al.

(10) Patent No.: US 7,128,323 B2
(45) Date of Patent: Oct. 31, 2006

(54) SEAL DEVICE

(75) Inventors: Tetsuya Iguchi, Saitama (JP); Hidetoshi Kasahara, Saitama (JP); Jun Hiromatsu, Saitama (JP)

(73) Assignee: Eagle Engineering Aerospace Co., Ltd., Tokyo (JP)

( * ) Notice: Subject to any disclaimer, the term of this patent is extended or adjusted under 35 U.S.C. 154(b) by 0 days.

(21) Appl. No.: 10/915,352

(22) Filed: Aug. 11, 2004

(65) Prior Publication Data
US 2005/0057003 A1    Mar. 17, 2005

(30) Foreign Application Priority Data
Aug. 20, 2003   (JP) .............................. 2003-296384

(51) Int. Cl.
F16J 15/02 (2006.01)
F28F 7/00 (2006.01)
F01D 11/08 (2006.01)
F01D 11/00 (2006.01)

(52) U.S. Cl. ...................... 277/644; 277/647; 277/530; 277/626; 277/567; 415/138; 415/173.3; 415/174.2

(58) Field of Classification Search ................ 277/530, 277/566–567, 603, 626, 628, 637, 644, 647–650; 415/135–136, 138–139, 173.3, 174.2
See application file for complete search history.

(56) References Cited

U.S. PATENT DOCUMENTS

| 2,701,155 | A | * | 2/1955 | Estel, Jr. | 277/555 |
| 2,776,865 | A | * | 1/1957 | Anderson | 277/481 |
| 4,188,037 | A | * | 2/1980 | Abbes et al. | 277/317 |
| 4,603,892 | A | * | 8/1986 | Abbes et al. | 285/336 |
| 5,354,072 | A | * | 10/1994 | Nicholson | 277/647 |
| 6,419,237 | B1 | * | 7/2002 | More | 277/602 |

FOREIGN PATENT DOCUMENTS

SU        1751558 A1 *   7/1992

* cited by examiner

*Primary Examiner*—Vishal Patel
(74) *Attorney, Agent, or Firm*—Arent Fox PLLC

(57) ABSTRACT

Primary objective of the present invention is to provide a seal device wherein the seal surfaces of the device are always brought into close contact against the side walls of the mounting slot regardless of fluid conditions. The seal device has two seal portions located to both sides of a bight shaped elastic portion which has a "U"-shaped cross section wherein the respective seal portions have a first side portion and a second side portion. The second side portions of the seal portions abut against each other in a symmetric manner in order to form a "W"-shaped seal body element. The end portions of the both second side portions of the seal body element are joined and seal surfaces are defined on the outer side surfaces of the both first side portions.

6 Claims, 11 Drawing Sheets

SEAL DEVICE

BACKGROUND OF THE INVENTION

1. Field of the Invention

The present invention relates to a seal device. More particularly, this invention relates to a seal device which is disposed in a mounting portion whose surrounding space is subject to deformation in shape under the influence of external forces, thermal deformation or the like.

2. Description of the Related Art

Related art 1 of the present invention is disclosed in U.S. Pat. No. 6,237,921. This seal ring is disposed in a gas turbine engine. A similar seal ring is also disclosed in U.S. Pat. No. 5,716,052. This seal ring has a "U"-shaped cross-section. The seal ring is mounted in such a location that seal portions of the seal ring perform elastic deformation due to either thermal stress of high temperature combustion gases or pressure or vibration caused by compressed gases which arises in a neighborhood of the combustion gas flow in the turbine engine. Also there is another type of seal ring whose cross-section is "E"-shape and used in a location for high temperature and high pressure such as gas turbine, nuclear related devices or the like.

FIG. 10 depicts a seal ring of the related art 1 as mentioned above. As shown in FIG. 10, the seal ring 120 has "U"-shaped cross-section thereof. Both end portions of the "U"-shaped seal ring 120 define reverse bend portions 132, 132. The seal ring 120 is a two-ply construction consisting of an inner ring 122 and an outer ring 126. Also an inner circumferential portion of the inner ring 122 defines a groove 134.

The seal ring 120 is used to effect a seal against a high pressure turbine nozzle 110 of a gas turbine. The high pressure turbine nozzle 110 retains a plurality of nozzle vanes 112. The nozzle bane 112 is mounted to a radially inner band 116 in an integral manner which is supported by a support flange 118. The seal ring 120 is arranged between the inner band 116 and the support flange 118 in order to bring the inner band 116 of the high pressure turbine nozzle 110 into sealing contact with the support flange 118.

In this high pressure turbine nozzle 110, high temperature combustion gases 114 received from an upstream combustion chamber (not shown) is turned and accelerated through the nozzle vanes 112. The inner band 116 and the support flange 118 start to receive thermal deformation as heating proceeds. The seal ring 120 which is disposed between the inner band 116 and the support flange 118 impaired by the thermal deformation is forced to undergo elastic deformation to an axial direction due to the thermal deformation of the inner band 116 and the support flange 118. Under this circumstance, a contact point 125 of the seal ring 120 which is located at the center of a "U"-shaped bending portion is supported by the support flange 118. This causes the seal ring 120 to have the reverse bend portions 132, 132 brought into contact with the inner band 116 and the support flange 118 and axially extending slots 134, 134, 134 are formed at three locations, which are defined within or between the reverse bend portions 132, 132. Therefore, it becomes increasingly more difficult for the seal surfaces 132A, 132B of the seal ring 120 to achieve a uniform contact force over a wide range of the elastically deformed area.

The inner ring 122 and the outer ring 126 which is mounted on the outer circumference of the inner ring 122 form a double-layer structure in which a problem arises in seal capability at the joint portions which form junctions at the both ends of an annular body as described in related art 1 (not shown). Out of the three open-ended slots 134, 134, 134 with "U"-shaped cross-section, the largest slot 134 formed in the inner circumferential side has its open-ended portion in an opposite direction to the other two small slots 134 which are relatively located to the both sides of the largest slot 134. Thus, for example, when a fluid pressure acts from a certain direction, a sufficient seal performance cannot be expected. Further, presence of the reverse bend portions 132, 132 disposed at the both open-ended portions of the seal ring 120 increases the production cost because of the difficult bending process involved.

FIG. 11 shows a seal ring 200 with an "E"-shaped cross-section. A similar relative art to the seal ring 200 is disclosed related art 2 in U.S. Pat. No. 4,121,843. The seal ring 200 has a cross-section of two fishing-hook like annular seal portions 201, 202 being joined at one end by means of a middle bridge portion 205. A middle groove 210 is formed between the individual annular seal portions 201, 202 after assembly. The annular seal portions 201, 202 have a first elastic portion 201B and a second elastic portion 202B of a semi-circular section, respectively. A first seal surface 201A and a second seal surface 202A are formed near the end portions of the first elastic portion 201B and the second elastic portion 202B, respectively, wherein the first seal surface 201A and the second seal surface 202A come into contact with a mounting component. In this seal ring 200, a distance from the middle bridge portion 205 to the respective first seal surface 201A and the second seal surface 202A is defined as L2.

In the seal ring 200, when the first seal surface 201A and the second seal surface 202A receive action forces thereat, the first elastic portion 201B and the second elastic portion 202B which have a semi-circular section only exhibit small elastic deformation, thus the middle bridge portion 205 performs elastic deformation such that a gap of the middle groove 210 is further narrowed. Presence of the middle groove 210, however, makes it difficult for the elastic deformation force at the middle bridge portion 205 to be delivered to the first seal surface 201A and the second seal surface 202A in a uniformly urging manner. If the gap in the middle groove 21 is further decreased to zero in which the first elastic portion 201B and the second elastic portion 202B are brought into contact with each other, elastic deformation starts to occur at the first elastic portion 201B and the second elastic portion 202B and this elastic deformation rapidly increases the load. Therefore, a seal ring 200 of this type is not suitable for a case in which a mounting slot for mounting the seal ring 200 changes in dimension. Also the bending process in the production of the seal ring 200 involves forming of "E"-shape, which increases the production cost.

The present invention is introduced to resolve the above mentioned problems and the development of necessary technologies associated with the problems have been under way. A primary technical goal which this invention tries to achieve is to provide a seal device which is capable of exhibiting a substantial sealing ability over a wide range of dimensional change in which external forces due to a fluid pressure, heat-induced stress or the like cause dimensional change in the width of a mounting slot for mounting the seal device. Another goal is to simplify the configuration and reduce its production cost. Yet another goal is to make the mounting process of the seal device straightforward and decrease its assembly cost.

BRIEF SUMMARY OF THE INVENTION

The present invention is made to alleviate the above technical problems and a solution to such problems is embodied as follows.

A seal device related to the present invention comprises a first seal portion having a "U"-shaped cross-section and including a first side portion and a second side portion on both sides of a bight-shaped elastic portion, a second seal portion having a first side portion and a second side portion being arranged to have the same form as the first seal portion and a joint portion joining an end portion of the second side portion of the first seal portion and an end portion of the second side portion of the second seal portion and bringing the second side portion of the first seal portion and the second side portion of the second seal portion into contact with each other in parallel wherein a first seal surface is defined on an outer side surface toward a distal end of the first side portions of the first seal portion and a second seal surface is defined on an outer side surface toward a distal end of the first side portion of the second seal portion.

According to the seal device 1 related to the present invention, it has a "W"-shaped cross-section and respective seal surfaces are defined on outer side surfaces toward distal ends of the first side portions. The joint portion is located at the end portions of the respective second side portions wherein the joint portion joins the two seal portions. This configuration allows the device to perform elastic deformation with respect to the joint portion as a fulcrum point when the respective seal surfaces are urged by the both side walls of the mounting slot due to an external force caused by thermal deformation or the like. Under this circumstance, the contact surfaces of the respective second side portions which are located closer to the elastic portion perform elastic deformation in such a manner that the surfaces depart from each other. This action allows the seal surfaces to exhibit outstanding seal performance by maintaining approximately a uniform surface pressure thereon despite a large displacement caused by the varying width of the mounting slot. Therefore, an effective seal capability can be expected over a wide range of displacement of the respective seal surfaces.

As the seal portions are bent to a "U"-shape with respect to the joint portion as a fulcrum point, the total length from the joint portion to the respective seal surfaces becomes fairly long and even if the second side portions of the respective seal portions are arranged short, the seal surfaces are allowed to move to the direction of surface pressure by a large amount. This enables the respective seal surfaces to effect a seal against thermal deformation, pressure deformation, vibration-induced deformation or the like. The seal device also can be made compact because the amount of elastic deformation of the seal surfaces can be determined by the length of the first side portion and the second side portion. Further, the respective seal portions can be fabricated individually and its machining process becomes simple, thus the production cost can be decreased. Also the seal device has a "W"-shape which makes its installation straightforward even for a mounting slot with a complex structure.

BRIEF DESCRIPTION OF THE DRAWINGS

Described below is details of the figures of preferred embodiments of a seal device constructed in accordance with the principles of the present invention. All the figures explained below are constructed according to actual design drawings with accurate dimensional relations.

Figure 1:
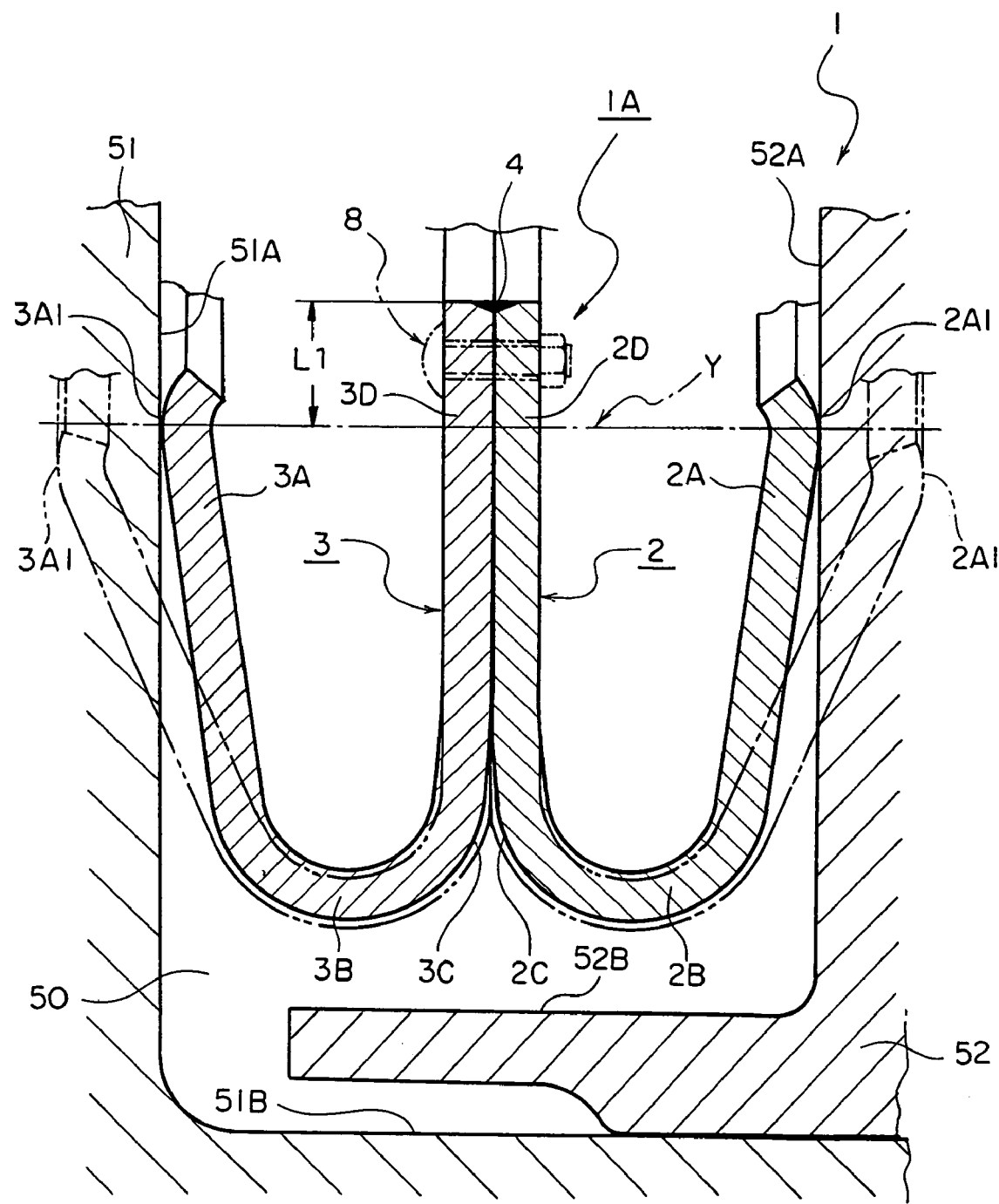
FIG. 1 is a cross-sectional view of a seal device according to a first embodiment of the present invention.

FIG. 1 is a seal device as a preferred first embodiment relative to the present invention. In FIG. 1, the seal device 1 has a seal body element 1A which is a "W"-shaped cross-section. The "W"-shaped seal body element 1A has a symmetric configuration in which a pair of a first seal portion 2 and a second seal portion 3 both having a "U"-shaped section abut against each other. The first seal portion 2 includes a first side portion 2A and a second side portion 2D which extends from the both ends of an annularly curved first elastic portion 2B. Likewise, the second seal portion 3 includes a first side portion 3A and a second side portion 3D which extends from the both ends of an annularly curved first elastic portion 3B. Abutting end portion of the second side portion 2D of the first seal portion 2 and the adjoining second side portion 3D of the second seal portion 3 can be welded to define a joint portion 4. Other than welding, the joint portion 4 can be arranged by fastening by a screw 8 as shown by virtual broken lines. Alternatively, a clamping element (not shown) with a "U"-shaped cross-section can be used to provide a clamp joint from the inner circumferential direction to the inner circumferential end portions of the abutting second side portion 2D and second side portion 3D. Yet alternatively, the end portion of the second side portion 3D can be extended longer than the end portion of the second side portion 2D and be inflected to a "U"-shape over the end portion of the second side portion 2D, followed by clamping the both end portions.

Next, a first seal surface 2A1 is defined on an outer perimeter surface of the first side portion 2A of the first seal portion 2. A second seal surface 3A1 also is defined on an outer perimeter surface of the second side portion 3A of the second seal portion 3. The first seal surface 2A1 and the second seal surface 3A1 are aligned on an axially longitudinal line Y. The axially longitudinal line Y is defined at a distance L1 from the joint portion 4. This dimension L1 is preferably small. The axially longitudinal line Y corresponds to the case in which the first elastic portion 2B and the second elastic portion 3B of the seal body element 1A are located radially inward. On the other hand, in case where either the first side portion 2A or the first side portion 3A of the seal body element 1A comes radially inward, the line Y becomes a radially longitudinal line (not shown) instead of axially longitudinal line. The axially longitudinal line Y passing through the seal surfaces 2A1, 3A1 can be placed, if necessary, more inwardly than the joint portion 4. In this configuration, a first side surface 2C of the second side portion 2D and a second side surface 3C of the second side portion 3D remain in contact with each other and, when the seal body element 1 is installed in a mounting slot 50, the first seal surface 2A1 of the first side portion 2A and the second seal surface 3A1 of the second side portion 3A change their states from the one shown by the virtual broken lines to the other indicated by the solid lines wherein the first seal surface 2A1 of the first side portion 2A and the second seal surface 3A1 of the second side portion 3A are brought into sealing contact with a first side surface 52A and a second side surface 51A of the mounting slot, respectively. Under this circumstance, the first side surface 2C of the second side portion 2D and the second side surface 3C of the second side portion 3D which are connected at the joint portion 4 alone are allowed to depart from each other as indicated by the transition from the virtual broken lines to the solid lines.

The seal device 1 is installed in the mounting slot 50 as stated above. The mounting slot is located in such a place that it is subjected to a high pressure, high temperature atmosphere in a gas turbine engine, a nuclear related device or the like. One component 51 which constitutes the mounting slot 50 has a second side surface 51A and a second bottom surface 51B. Similarly, the other component 52 defining the mounting slot 50 has a first side surface 52A and a first bottom surface 52B. The one component 51 and the other component 52 allow the bottom surfaces 51B, 52B to relatively move against each other in order to alter the width of the mounting slot 50 according to thermal deformation or the like. When the seal device 1 is installed in the mounting slot 50, the first seal surface 2A1 is brought into sealing contact with the first side surface 52A. Also the second seal surface 3A1 is brought. into contact with the second side surface 51A. If the distance between the both side surfaces 51A, 52A of the mounting slot 50 is shortened, the first side portion 2A on one side and the first side portion 3A on the other side perform elastic deformation with respect to the joint portion 4 as a fulcrum point. Under this circumstance, the first seal surface 2A1 and the second seal surface 3A1 are further separated from each other due to the elastic deformation. This allows the first seal surface 2A1 and the second seal surface 3A1 to undergo large elastic deformation while maintaining approximately uniform surface pressures against the first side surface 52A and the second side surface 51A of the mounting slot 51. As a result, the seal device 1 exhibits an outstanding seal performance even under the displacement of the both side surfaces 51A, 52A of the mounting slot 50. Such a compact configuration of the seal device 1 allows the device to be installed in a narrow slot located at the junctions of fluid passages.

Figure 2:
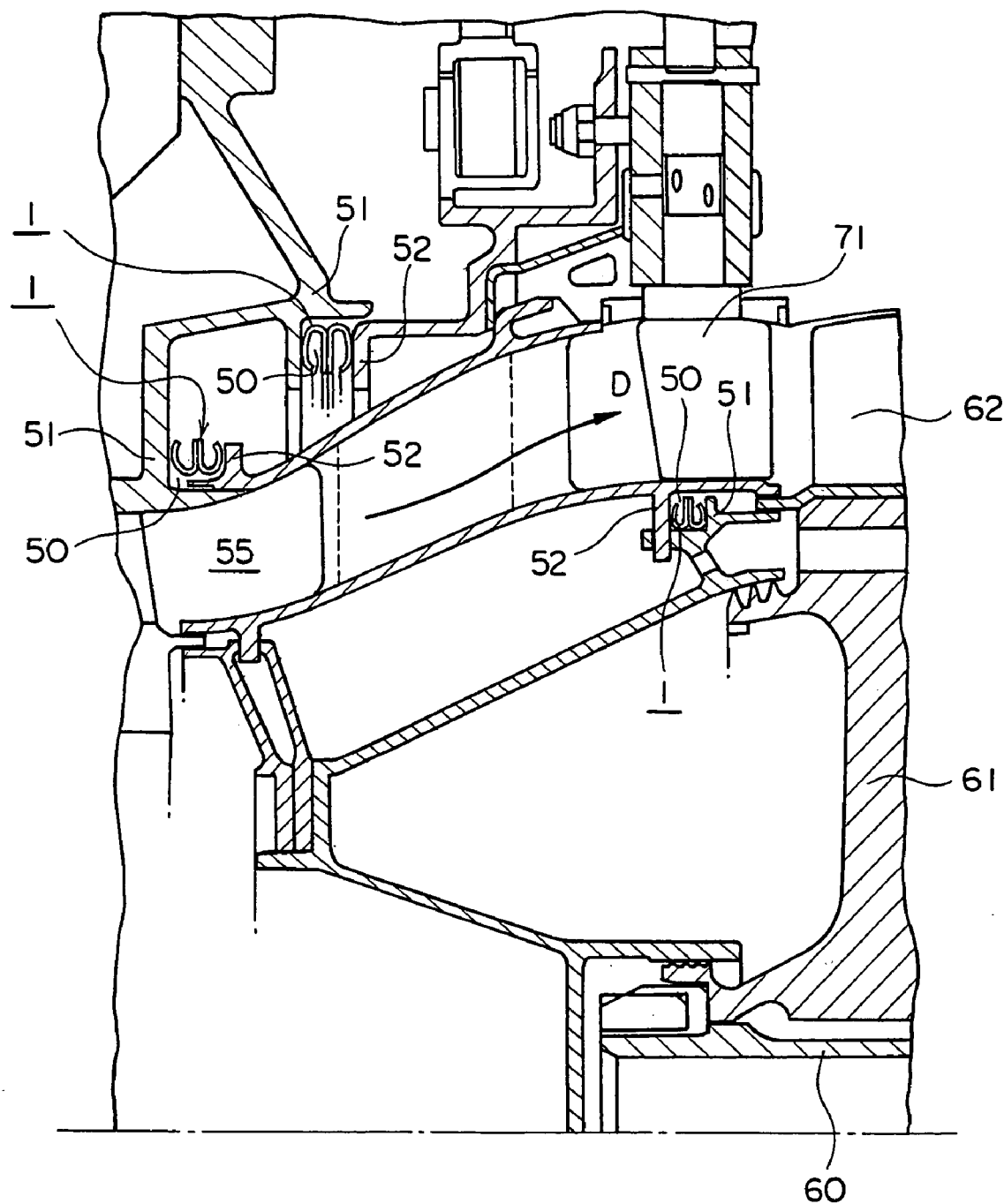
FIG. 2 is a cross-sectional view of a portion of a gas turbine engine which mounts a seal device of the present invention.

FIG. 2 is a cross-sectional view of a portion of a gas turbine engine. In FIG. 2, a rotary disk 61 mounted on a rotary shaft 60 retains blades 62 thereon. Another type of blade 71 is disposed in a fluid passage 55. Hot gases D received from a combustion chamber (not shown) is turned and accelerated through the blades 62, 71. In this configuration, the seal device 1 is disposed in the mounting slot 50 of the junctions for effecting a seal at the junctions constituting the fluid passage 55. The mounting slot 50 mounting the seal device 1 is arranged between one component 51 and the other component 52. This one component 51 and the other component 52 are arranged in such a way that the mounting slot 50 of the joint portion can adapt its shape when they receive a thermal deformation or vibratory force. Three sets of the seal device 1 are disposed for sealing the gaps at the joint portions associated with the fluid passage 55. The seal devices 1 have the same configuration as that given in FIG. 1. As described in FIG. 1, a seal device 1 of this kind is capable of effecting a tight seal against hot gases D over a wide range of displacement between the one component 51 and the other component 52.

FIG. 1 is an example in which a couple of pressure receiving slots and a joint portion 4 are arranged in the inner circumference of the seal body element 1A. On the other hand, arranging the two pressure receiving slots and the joint portion 4 in the outer circumferential side defines a similar invention and results in similar effects. When the seal body element 1A is mounted on a mounting slot 50 of a straight form, the seal body element 1A is to be arranged in a straight form as well. The seal device 1 of the present invention is arranged in an annular, straight or curved form according to the shape of the mounting slot 50. The seal device 1 is made of a nickel-based alloy. Example of such a material is 76% Ni-16% Cr-8% Fe, i.e., INCONEL. INCONEL has high ductility and can be processed by hot/cold forming. It also has an outstanding corrosion resistance.

Figure 3:
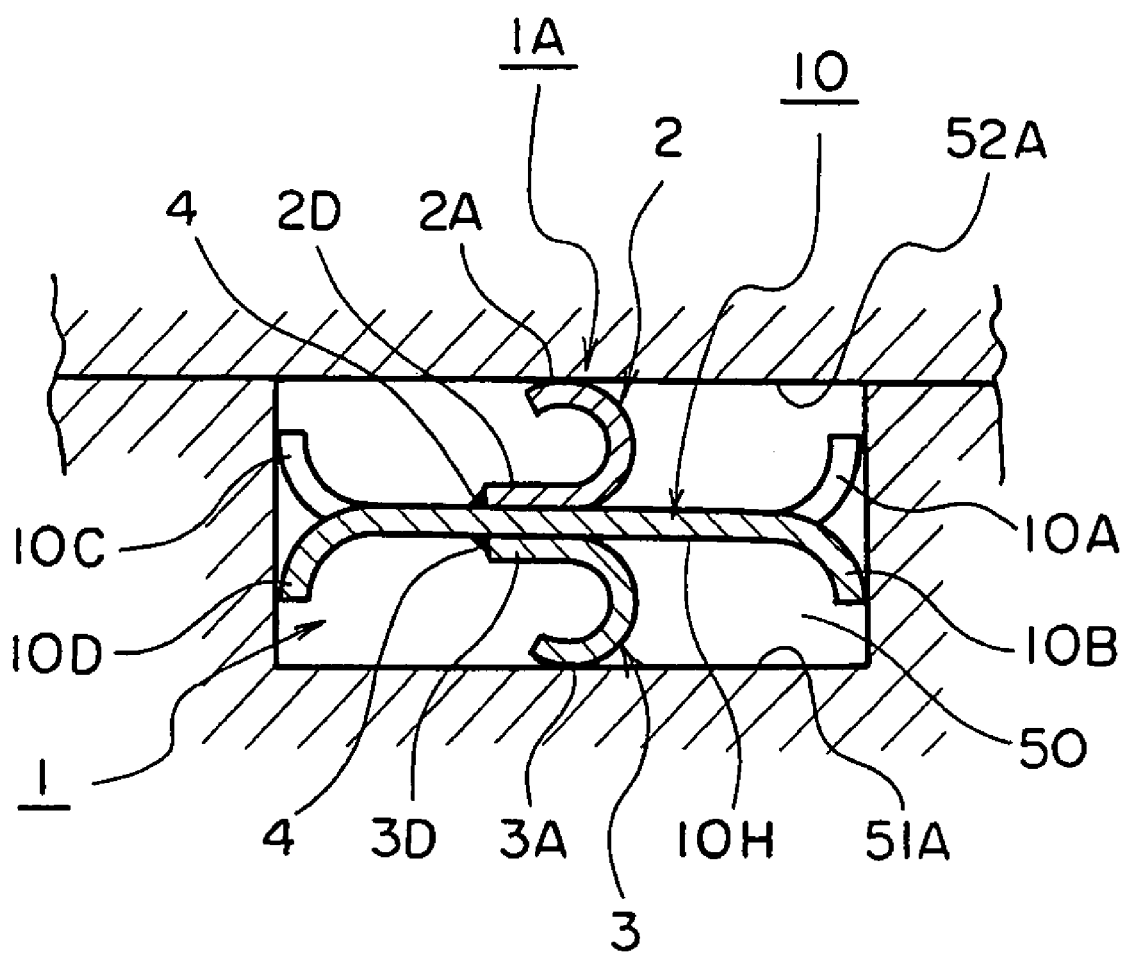
FIG. 3 is a cross-sectional view of a seal device according to a second embodiment of the present invention.
Figure 4:
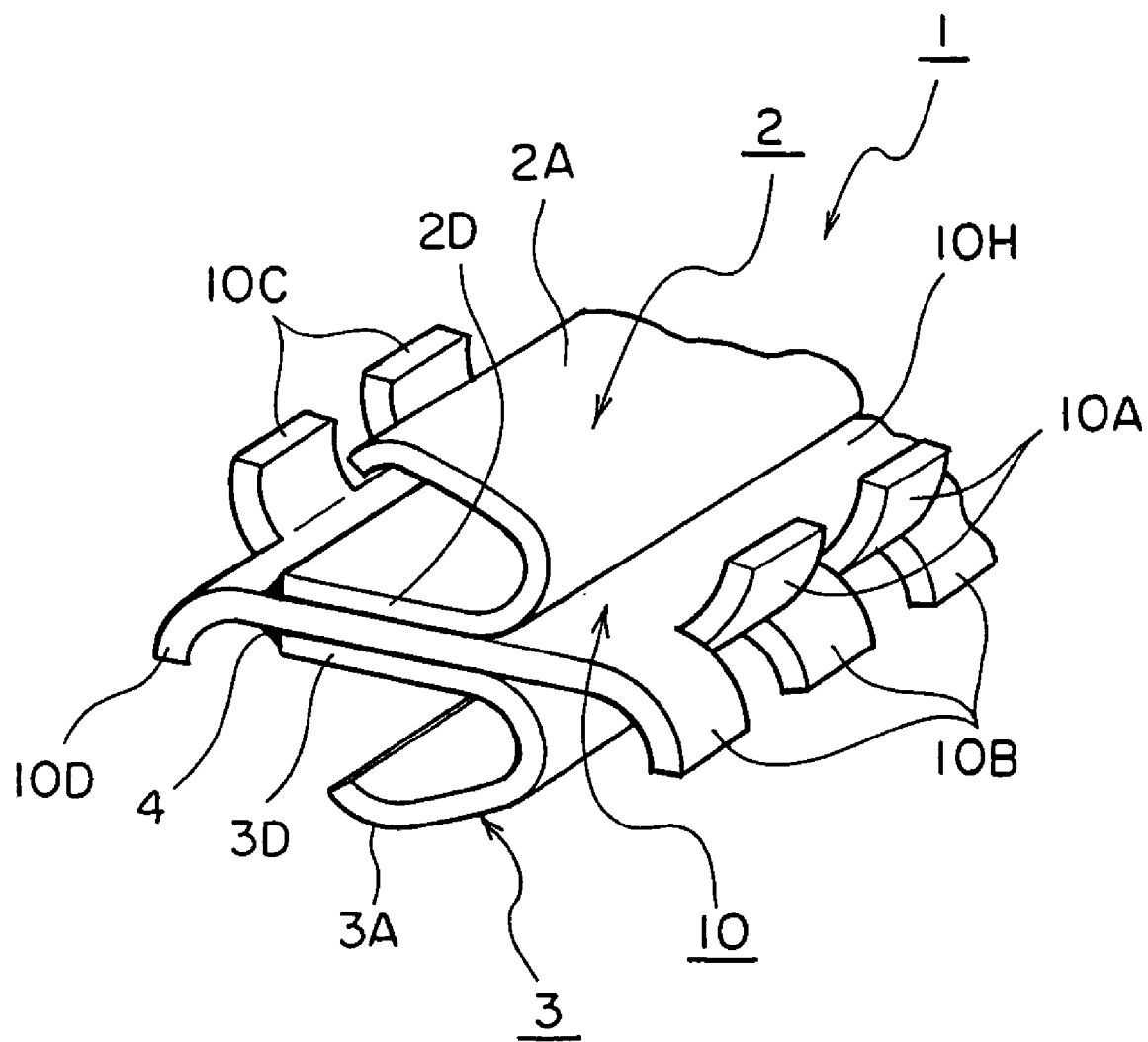
FIG. 4 is an oblique view of the seal device in FIG. 3.

FIG. 3 and FIG. 4 show a seal device 1 of the second embodiment of the present invention. FIG. 3 is a cross-sectional view of the seal device 1. FIG. 4 is an oblique view of FIG. 3. In FIG. 3 and FIG. 4, a support portion 10 is disposed between the second side portion 2D of the first seal portion 2 and the second side portion 3D of the second seal portion 3, and the respective end portions of the side portions 2D, 3D are welded to the support portion 10 in which the welded portion defines joint portions 4. The first seal portion 2 and second seal portion 3 have more or less the same form as the seal body element 1A given in FIG. 1. The seal device 1 is all made of INCONEL.

As shown in FIG. 4, an annular plate constitutes a main body 10H of the support portion 10. The outer circumferential portion of the main body 10H defines contact portions 10A, 10B which are disposed along the circumference and curved toward alternately opposite directions. Also the inner circumferential portion of the main body 10H defines contact portions 10C, 10D which are disposed along the circumference and curved toward alternately opposite directions. These contact portions 10A, 10B, 10C, 10D come into contact with the corresponding mounting surfaces of the mounting slot 50 and provide a secure support in such a manner that the seal surfaces of the first side portion 2A and second side portion 3A of the seal device 1 are securely brought into sealing contact with the respective side surfaces 51A, 52A of the mounting slot 50. Other arrangement of the seal device 1 in FIG. 3 is similar to the seal device 1 shown in FIG. 1.

Figure 5:
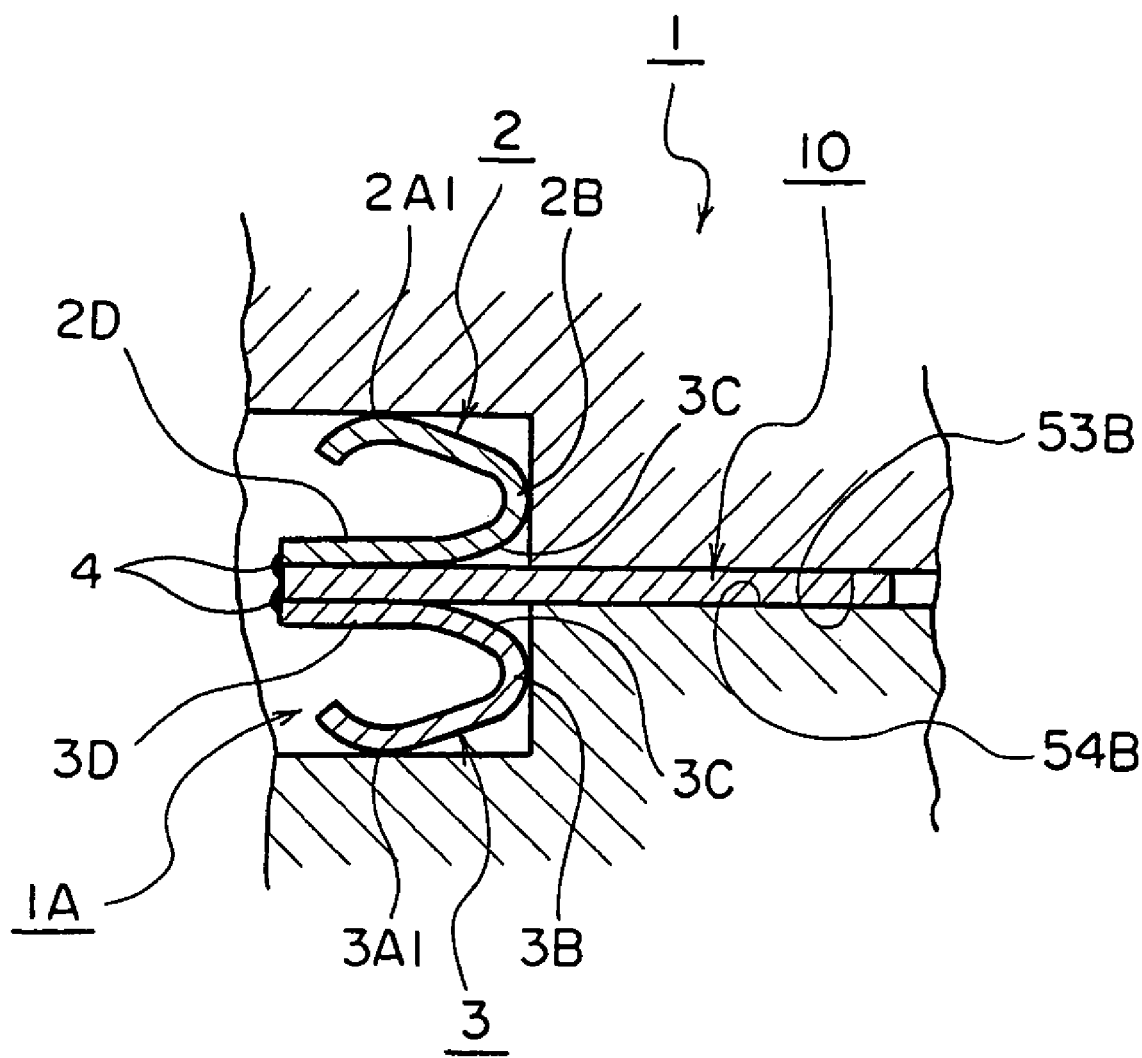
FIG. 5 is a cross-sectional view of a seal device according to a third embodiment of the present invention.
Figure 6:
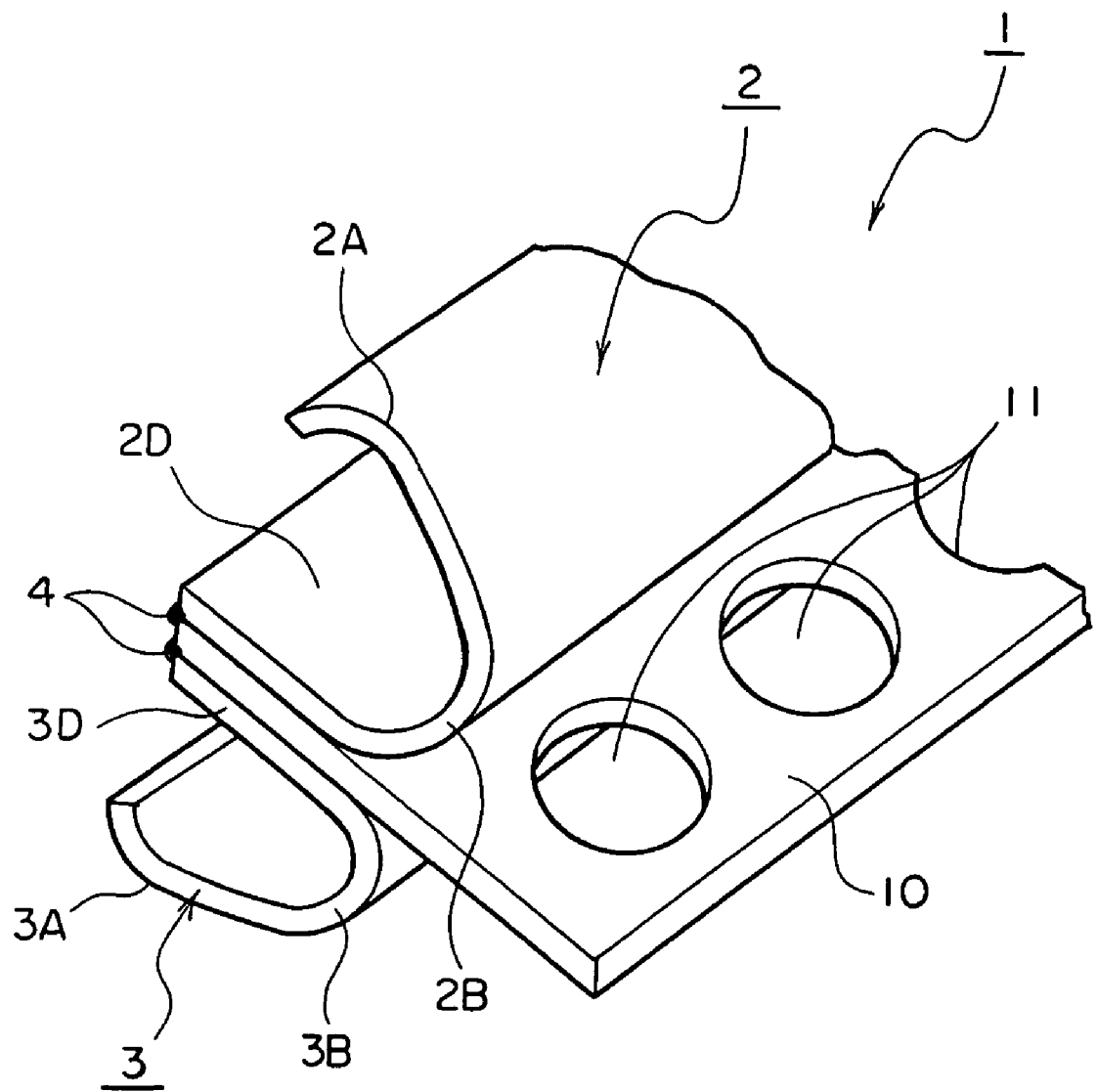
FIG. 6 is an oblique view of the seal device in FIG. 5.

FIG. 5 and FIG. 6 show a seal device 1 of the third embodiment of the present invention. This seal device 1 has a support portion 10 which is a flat plate. The end portion of the second side portion 2D of the first seal portion 2 which is located to one side of the support portion 10 and the end portion of the second side portion 3D of the second seal portion 3 which is located to the other side of the support portion 10 are welded with the end portion of the support portion 10 in which the integrally welded portion defines a joint portion 4. A circumferential surface on the other side of the support portion 10 retains a plurality of holes 11 which are equally spaced along the circumferential direction. The portion of the support portion 10 including the holes 11 is press-fixed by mounting bottom surfaces 53B; 54B, which securely holds the seal body element 1A. At the same time, the first seal surface 2A1 and the second seal surface 3A1 are brought into contact with the side walls of the mounting slot 50 for effecting a seal thereat. The first seal surface 2A1 and the second seal surface 3A1 can achieve stable sealing contact with the side walls of the mounting slot 50 because the support portion 10 is held in an immobilized manner. The pressure receiving slot of the first seal portion 2 which is defined between the first side portion 2A and the second side portion 2D as well as another pressure receiving slot of the second seal portion 3 which is defined between the first side portion 3A and the second side portion 3D have an open slot toward the sealed fluid. Other arrangement of the deal device 1 in FIG. 5 is similar to the seal device 1 shown in FIG. 1.

Figure 7:
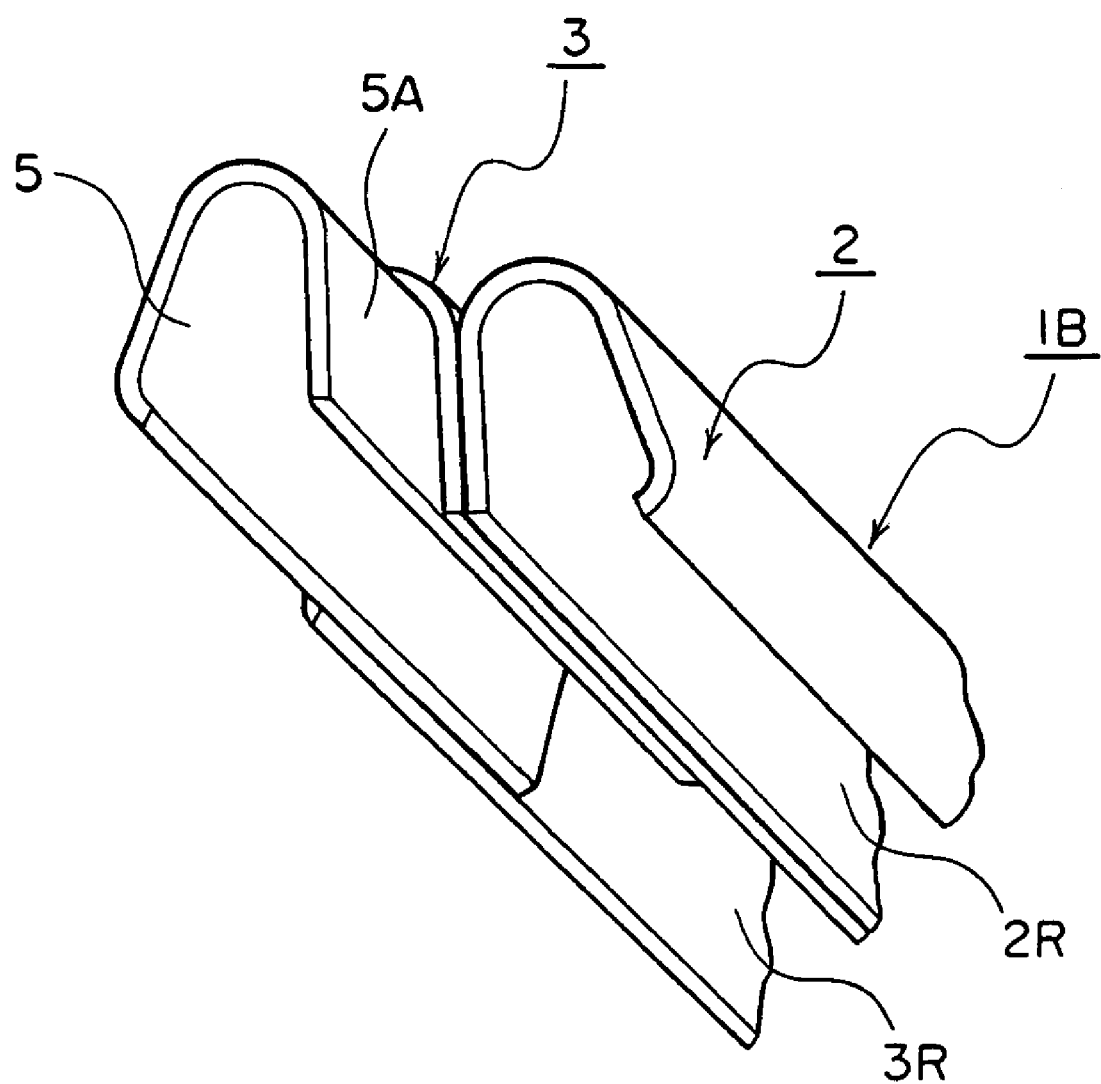
FIG. 7 is an oblique view of a seal device according to a fourth embodiment of the present invention.

FIG. 7 shows a seal device 1 of the fourth embodiment of the present invention. This seal device 1 can be arranged either in a straight form or in an annular form. In order to make the device expandable/retractable along its longitudinal direction, it is longitudinally dividable into two or three segments of an equal length. The segmented seal device 1B as a seal device 1 can longitudinally expand or retract by a force caused by thermal expansion or the like. It is also effective when mounting of the seal device 1 is not straightforward, because of a structural complexity of the mounting slot 50 as seen in gas turbine engine.

This seal device 1 is similar to FIG. 1. That is, the seal device 1 given in FIG. 1 is split into two equal segments. A second fit groove 3R of a second seal portion 3 in a second segmented seal device 1B which is one of the two equally divided segments, is fitted with a close contact surface 5A of a first coupling portion 5. Similarly, a first fit groove 2R of a first segmented seal device 1B which is the other one of the two equally divided segments and of the same form as FIG. 7, is fitted with a close contact surface 5A of a second coupling portion 5 (not shown) which is of the same form as the first coupling portion 5. The first segmented seal device 1B and the second segmented seal device 1B are thus joined through the respective coupling portions 5. Like the seal device 1 of FIG. 1, the seal device 1 thus integrated effects a seal against the sealed fluid by the first seal surface 2A1 and the second seal surface 3A1 adjusting their locations in accordance with thermal deformation, even when the seal device 1 is installed in the mounting slot 50 under the influence of thermal expansion. Longitudinal displacement of the seal device 1 is absorbed by a sliding movement of the close contact surfaces 5A of the respective coupling portions 5, 5. The individual segmented seal devices 1B, 1B can be assembled with the respective coupling portions 5, 5 from either direction with no directional dependence. Therefore, producing many segmented seal devices 1B . . . of equal size allows one to use necessary number of pieces to realize a desired length of the device.

Figure 8:
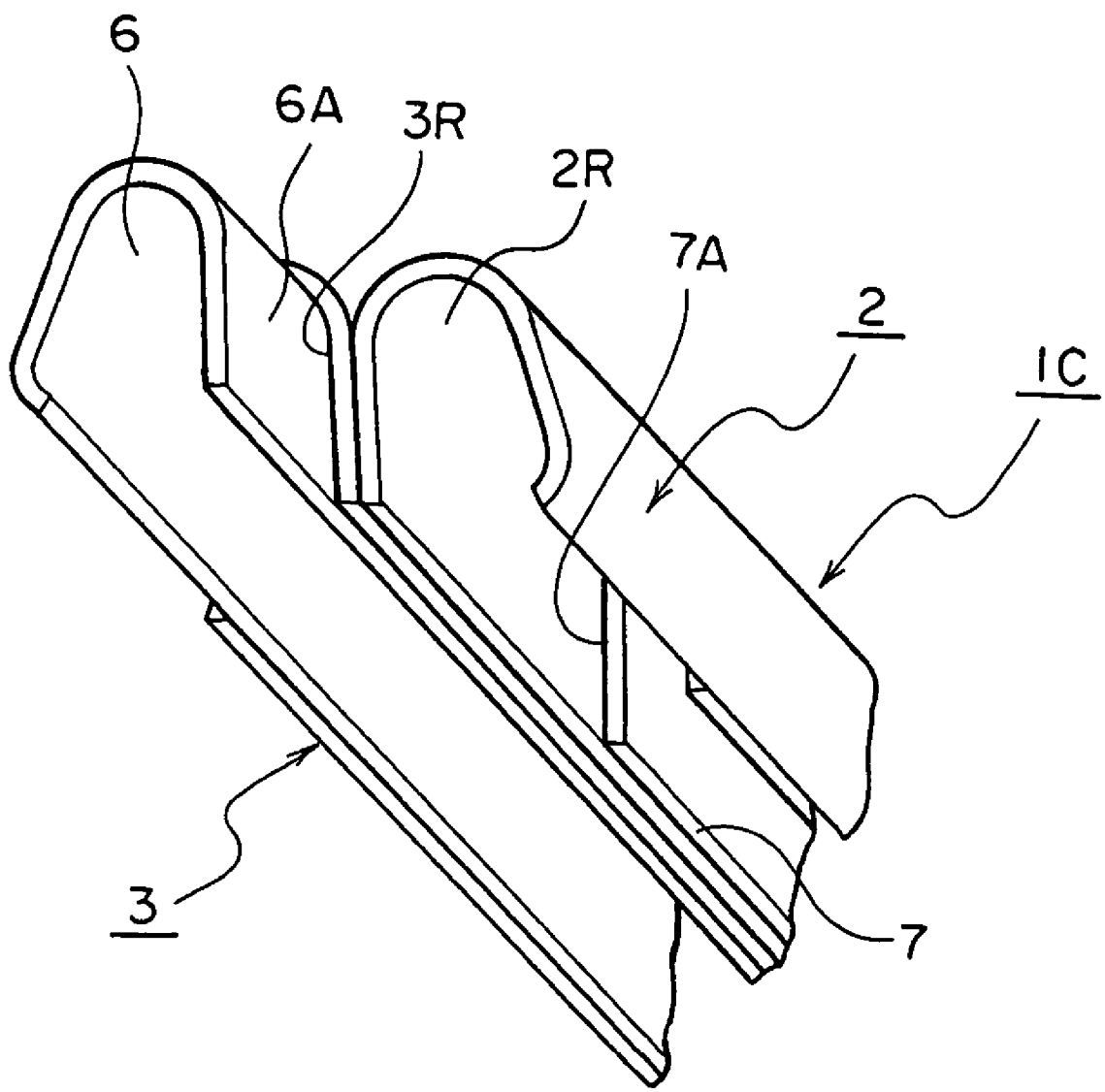
FIG. 8 is an oblique view of a seal device according to a fifth embodiment of the present invention.

FIG. 8 shows a seal device 1 of the fifth embodiment of the present invention. This seal device 1 is arranged to provide a similar function to the seal device 1 of FIG. 7. The seal device 1 of FIG. 8 has a seal body element 1A which is similar to FIG. 1. The seal device 1 further inludes a first coupling seal portion 7 which has a "U"-shaped cross-section and is of equal length as the seal body element 1A wherein the first coupling seal portion 7 is fitted with a first fit groove 2R of the first seal body element 1A. The device also includes a second coupling seal portion 6 which has a "U"-shaped cross-section and fitted with a second fit groove 3R. The first coupling seal portion 7 fitted with the first fit groove 2R and the second coupling seal portion 6 fitted with the second fit groove 3R are arranged to protrude by an equal length relative to the respective fit grooves 2R, 3R toward the opposite direction.

A plurality of the segmented seal device 1C thus formed are manufactured and the fit grooves 2R, 3R, respectively, are joined with the protruding coupling seal portions 6, 7. The respective fit grooves 2R, 3R are brought into a seal tight contact, layer by layer, with the close contact surfaces 6A, 7A of the coupling seal portions 6, 7. Once many pieces of the segmented seal devices 1C are produced, arbitrary number of pieces of the segmented seal devices 1C can be employed to obtain a desired total length because the segmented seal devices 1C can be assembled from either direction due to its non-directional dependence. Therefore, the expansion/retraction of the joint portion of the segmented seal devices IC in accordance with thermal deformation or the like is capable of effecting a seal against a mounting slot 50 which is subject to a relative displacement.

Figure 9:
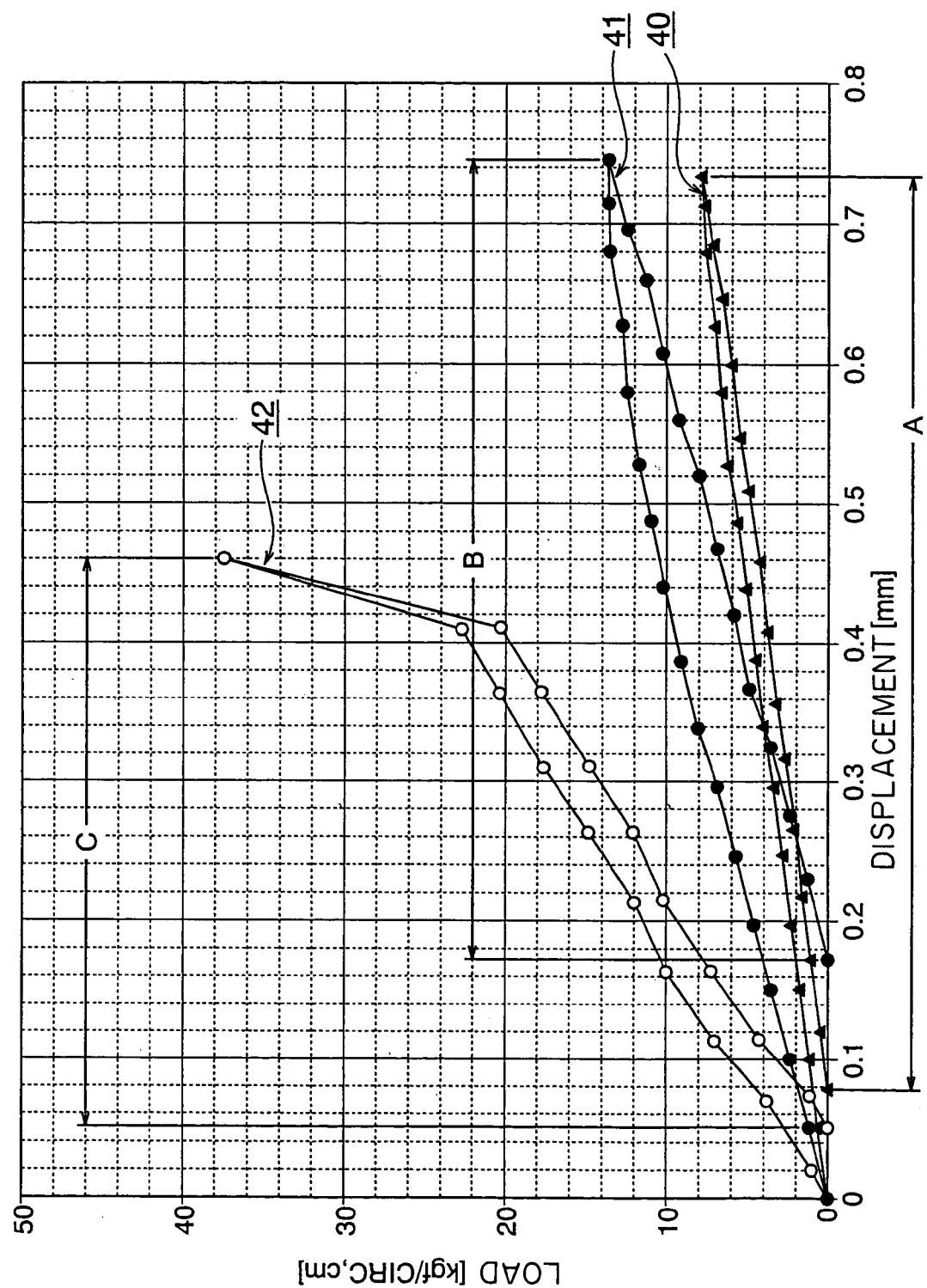
FIG. 9 is load-displacement diagrams for the seal devices according to the first embodiment and the second embodiment of the present invention and a seal ring as a comparison example 1
Figure 10:
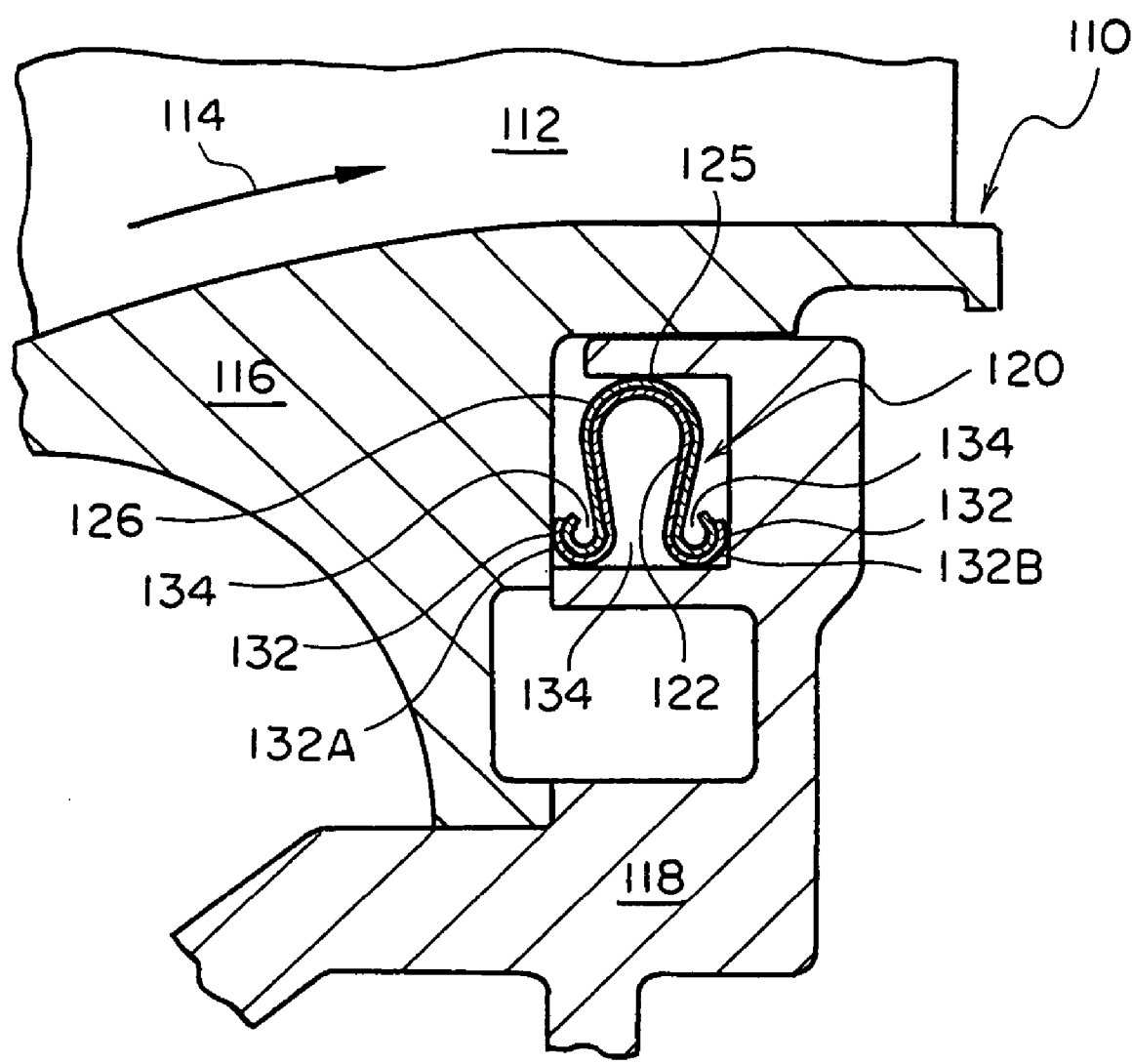
FIG. 10 is an oblique view of a seal device as a first related art relative to the present invention.
Figure 11:
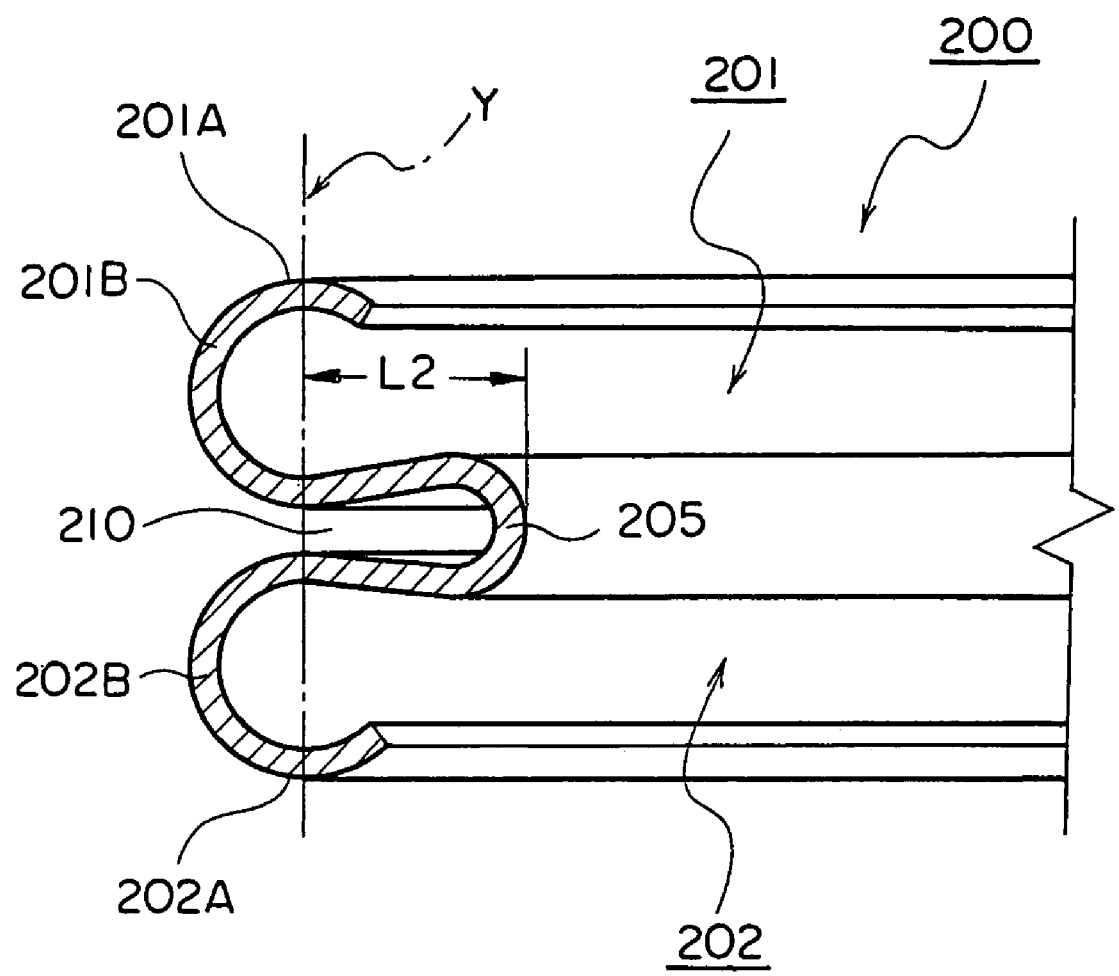
FIG. 11 is an oblique view of a seal device as a second related art relative to the present invention.

FIG. 9 shows the results of FEM analysis of the seal devices 1 of FIG. 1 with two different choices in plate thickness, which are referred to the example 1 and the example 2, and a reference example 1 which is a seal device 200 shown in FIG. 11 wherein the results are plots for load-versus-displacement relationship which reflect the state transitions of the individual devices according to the compressive force exerted in a direction shortening the distance between the both seal surfaces. As an additional reference example 1 for the FEM analysis, a "E"-section seal ring of FIG. 11 with a middle groove 210 and L2=0 exhibits a similar result to the previous seal device 200 in FIG. 11. A reference numeral 40 in FIG. 9 represents the diagram of the example 1 wherein the load-versus-displacement relationship was examined based on the assumption of plate thickness 0.3 mm for the first seal portion 2 and the second seal portion 3 of the seal device 1 in FIG. 1. The diagram for the example 1 shows that the load (kgf/circ.cm) does not increase as sharply as the displacement (mm) does. This implies that the surface pressure can be kept more or less constant over a wide range of displacement of the seal surfaces 2A1, 3A1 of the seal device 1, thus the seal capability is maintained. The wide range of the spring back region assures an outstanding seal performance against relative displacement of the side walls of the mounting slot 50. Reference numeral "A" in FIG. 9 represents the spring back region.

Next, another diagram indicated by a reference numeral 41 in FIG. 9 corresponds to the example 2. Plate thickness chosen for the first seal portion 2 and the second seal portion 3 of the seal device 1 in the example 2 is 0.4 mm. FEM analysis was conducted with this seal device 1 in order to obtain a load-versus-displacement relationship. The diagram for the example 2, in comparison with the load-versus-displacement relationship of the reference example 1, i.e., the seal ring 200 in FIG. 11, shows that the load (kgf/circ.cm) increases only slowly relative to the increase in the displacement (mm). As these load-versus-displacement diagrams show, a superior seal performance can be exhibited comparing with conventional seal rings. That is, a more or less constant surface pressure is maintained on the respective seal surfaces 2A1, 3A1 over a wide range of displacement and a seal capability lasts for a long time period. Even if the first seal portion 2 and the second seal portion 3 are subjected to a load, plastic deformation is not admitted for a long time. In case of the examples 1 and 2, in particular, a seal capability becomes eminent with a small plate thickness in the first seal portion 2 and the second seal portion 3.

This leads to a compact arrangement of the seal device 1. Reference numeral "B" in FIG. 9 represents the corresponding spring back region.

Reference numeral 42 in FIG. 9 represents the load-versus-displacement diagram of the seal ring 200 shown in FIG. 11 as a reference example 1 wherein the analysis is conducted based on FEM assuming that the seal ring 200 is compressed between the both seal surfaces. The seal ring 200 is arranged as shown in FIG. 11. It, however, is seen in FIG. 4 of U.S. Pat. No. 6,237,921 that the seal ring (reference numeral 38) thereof results in a similar load-versus-displacement diagram. In this load-versus-displacement diagram, a moderate ascending angle is maintained up to a displacement of 0.4 mm and the angle increases more rapidly after 0.4 mm. This observation in the reference example 1 implies that the seal surfaces 201A, 202A of the seal ring fail to exhibit a uniform seal performance against the side wall displacement of the mounting slot because of the middle groove 210 with which the elastic portion 205 is arranged to a bight form thereat. Also in the reference example 1, plastic deformation is observed at the bight portion in which stress concentration occurs due to repetitive loads according to the load-versus-displacement diagram. This results in a weakened seal performance. Reference numeral "C" in FIG. 9 represents the corresponding spring back region.

The seal device 1 of the present invention exhibits an outstanding seal capability as well as durability when installed in a mounting slot 50 operated under a hot, high pressure fluid. The seal device 1 enjoys a simple construction and its installation is straightforward even to a mounting slot 50 of complex arrangement, thus the assembly cost can be decreased. This seal device 1 is capable of providing a secure seal even when the gap of the mounting slot 50 defined by different parts has a rough arrangement as shown in FIG. 2. Also the first seal portion 2 and the second seal portion 3 of the seal device 1 are fabricated separately before they are assembled to build the seal device 1. Therefore its machining cost can be decreased.

Next, embodiments of the other inventions related to the present invention are described below.

A seal device as an example of a second invention relative to the present invention disposes an annularly shaped elastic portion of a seal portion wherein the open end of the elastic portion faces either radially inward or outward.

According to the seal device of the second invention, the both seal portions are arranged to form a "W"-shaped configuration and the open ends of the pressure receiving grooves defined between the first side portion and the second side portion can be directed toward the action of the sealed fluid. Therefore, this seal device can be used for whichever the mounting slot construction may be, either the sealed fluid acting from radially inward or from radially outward.

A seal device as an example of a third invention relative to the. present invention retains the end portions of the respective side portions which radially or axially extend to reach a proximal region passing through the axis of the joint portion.

According to the seal device of the third invention, the second side portions are arranged to be of approximately equal length to the first side portions and the contact width of the seal surfaces thus can be held small. In addition, the seal surfaces are allowed to move by a large amount of displacement along the direction of the action of surface pressure. This brings an advantage that the seal device is capable of effecting a seal over a wide range of displacement under the device configuration in which the width of the mounting slot changes by a large amount.

A seal device as an example of a fourth invention relative to the present invention has a joint portion which is defined either by welding at the end portions of the respective second side portions or by clamping by means of a "U"-sectioned clamping element.

According to the seal device of the fourth invention, joining the second side portions at the joint portion by means of welding or clamping makes it possible to manufacture the seal portions through machining whether they are produced from a thin plate or a thick plate. Design applicability of the seal device thus can be broadened.

A seal device as an example of a fifth invention relative to the present invention arranges both seal portions thereof to be made of nickel based alloy.

According to the seal device of the fifth invention, precipitation hardened nickel alloy can be chosen as a candidate for the nickel based alloy of the seal portions, which exhibits high temperature strength and corrosion resistance. Therefore, an outstanding creep strength at high temperature (about 700° C.), good weldability and no crack induction can be expected.

A seal device as an example of a sixth invention relative to the present invention arranges both seal portions to have support portions thereon and the support portions are retained by the components defining the mounting slot.

According to the seal device of the sixth invention, the support portion sandwiched between the both seal portions in an integral manner allows the seal device to be securely installed to a mounting slot of any type of structure. This enables the seal surfaces to come into secure contact with the side walls of the mounting slot for the outstanding seal performance. Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

As described above, the seal device of the present invention can effectively be used at connections of generic machines which require sealing against a hot and high pressure fluid. In particular, a seal device of this kind is effective for the use of the mounting slots of turbine engines, nuclear devices or the like which are subject to deformation due to stress caused by the hot and high pressure fluid. Also its high applicability to any type of mounting slot as well as its low production cost brings additional advantages to this seal device.

What is claimed is:

1. A metallic seal device for effecting a seal by abutting against side walls defining a mounting slot, said seal device comprising:
    a) a metallic first seal portion having a "U"-shaped cross-section and including a first elastic portion, and a first side portion and a second side portion on both sides of said first elastic portion;
    b) a metallic second seal portion having a first elastic portion, a first side portion and a second side portion being arranged to have the same form as said first seal portion, wherein said elastic portion of said first and second seal portions is continuous along an entire length of the seal device; and
    c) a joint portion joining an end portion of the second side portion of said first seal portion and an end portion of the second side portion of said second seal portion and bringing the second side portion of said first seal portion and the second side portion of said second seal portion into contact with each other in parallel;

wherein a first seal surface is defined on an outer side surface toward a distal end of the first side portion of said first seal portion and a second seal surface is defined on an outer side surface toward a distal end of the first side portion of said second seal portion.

2. A seal device as claimed in claim 1, wherein said elastic portion has an annular form and defines either radially inner circumference or radially outer circumference.

3. A seal device as claimed in claim 1, wherein a distal end portion of said first side portions radially or axially extend to a proximal region passing through said joint portion.

4. A seal device as claimed in claim 1, wherein said joint portion is defined by welding the end portions of the both second side portions or by clamping the end portions of the both second side portions with a "U"-sectioned clamping element.

5. A seal device as claimed in claim 1, wherein said both seal portions are made of a nickel based alloy material.

6. A seal device as claimed in claim 1, wherein said both seal portions have a support portion therebetween and said both seal portions are retained through said support portion by components defining the mounting slot.

* * * * *